Patented July 11, 1933

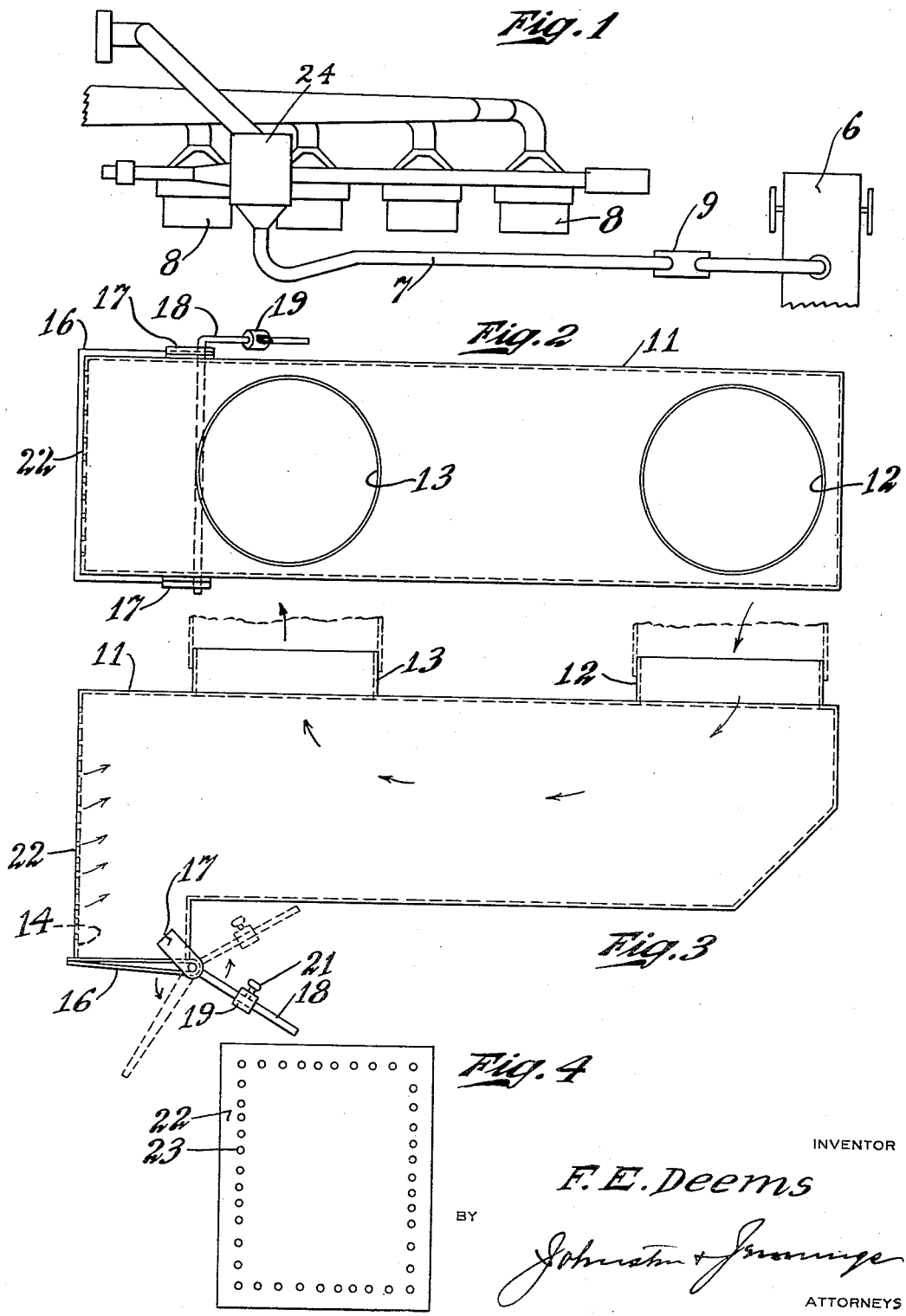

1,917,954

UNITED STATES PATENT OFFICE

FRANK E. DEEMS, OF BIRMINGHAM, ALABAMA, ASSIGNOR TO CONTINENTAL GIN COMPANY, A CORPORATION OF DELAWARE

ROCK TRAP

Application filed April 13, 1931. Serial No. 529,856.

My invention relates to traps for removing heavier from lighter material while in transit in an air current such as, for example, removing rock and other relatively heavy foreign substances from cotton while being moved by a pneumatic conveyor to a cotton gin.

One of the objects of my invention is to provide a trap which shall be adapted to be interposed in a pneumatic conveyor duct to remove pebbles and other foreign material from air borne cotton.

Another object of my invention is to provide a trap including means adapted to effect a thorough separation and removal of cotton from the rocks and foreign substances that are separated therefrom and caused to collect in the trap.

A further object of my invention is to provide means for automatically discharging the separated foreign substances from the trap.

Briefly, my invention hereinafter referred to as a "rock trap" comprises an elongated casing having spaced end inlet and outlet openings. A pocket is provided at the outlet end of the casing wherein the heavier foreign material will collect and is provided with a trap door adapted to open automatically when suction on the rock trap is interrupted or the trap door is overbalanced by the load of rocks, etc., thereon, to release the heavier foreign material from the pocket. The casing wall adjacent the pocket is perforated to admit streams of air to flow into the casing and act to separate the cotton from the rocks and other foreign material falling into the pocket.

Apparatus embodying features of my invention is illustrated in the accompanying drawing forming a part of this specification, in which:

Fig. 1 is a plan view showing the manner in which the rock trap is interposed in an air conduit leading from a wagon to a plurality of cotton gins;

Fig. 2 is a plan view of the rock trap;

Fig. 3 is a side elevation view of the rock trap; and

Fig. 4 is a detail view of the end wall of the casing and showing the manner in which it is perforated to admit streams of air into the casing.

Referring now to the drawing for a better understanding of my invention, I show in Fig. 1, a wagon 6 in position to deliver cotton pneumatically through a conduit 7 to a plurality of cotton gins 8. My improved rock trap 9 is interposed in the conduit 7.

The rock trap comprises an elongated casing 11 having an inlet 12 and an outlet 13, both being in the upper wall of the casing near the ends thereof. A pocket 14 is formed in the bottom at the outlet end of the casing and is provided with a trap door 16 which is pivotally mounted in brackets 17. A weight arm 18 extends rearwardly from the trap door and carries a weight 19 which is adapted to be secured at any point throughout the length of the arm by means of the thumb screw 21. The end wall 22 of the casing is provided with holes 23 adapted to admit streams of air into the pocket and casing.

In operation, the air, cotton and foreign material which are being drawn through the conduit 7 by the blower 24 enter the casing 11 through the inlet 12 and, due to their momentum, have a tendency to follow a straight line and to strike against the end wall 22. The cotton then leaves the casing through the outlet 13 allowing the rocks to fall by gravity into the pocket 14 which is counterbalanced so as just to close when suction is off the rock trap. In order to prevent cotton accumulating with the rocks in the pocket 14, I provide the holes 23, preferably marginally arranged about the end wall 22, through which streams of air are drawn into the casing with just enough force to overcome the tendency of cotton to fall down into the pocket and cause it all to pass out of the casing through the upper outlet 13. The momentum of the rocks and other relatively heavy material being greater than the cotton, causes them to strike against the end wall 22 and fall into the pocket 14. This foreign material is held in the pocket by the trap door as long as the suction fan 24 is in operation, after which the weight of this foreign material will unbalance and cause the door to open and discharge the contents of the pocket free of cotton. When too great an amount of rocks, etc., collects on the trap door it will open and relieve the trap, but ordinarily suction is cut off frequently enough to keep the trap free of excessive accumulations of rocks, etc., therein.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a rock trap, an elongated casing subject to suction and having side walls, end walls, a top and a bottom, means defining an inlet in the top of the casing at one end thereof, means defining an outlet in the top of the casing at the opposite end thereof from the inlet, means defining a pocket in the bottom of the outlet end of the casing, means defining restricted apertures in the end wall of the casing adjacent the pocket, and so disposed as to admit air in a direction counter to the flow due to suction and a trap door hinged to the casing beneath the pocket.

2. In a rock trap, an elongated horizontally disposed casing, means defining an inlet in the top of the casing at one end thereof, means defining an outlet in the top of the casing at the end opposite the inlet, means defining a pocket in the bottom of the casing at the outlet end thereof and beyond said outlet, means defining apertures in the end of the casing adjacent the pocket, and a trap door hinged to the casing beneath the pocket.

3. A rock trap comprising an elongated horizontally disposed casing, means defining an inlet for air and material borne thereby in the top of the casing near one end thereof, means defining an outlet in the top of the casing near the end opposite the inlet, means defining a pocket in the bottom of the casing at the end opposite the inlet, a counter-balanced door hinged to the bottom of the pocket, and means defining a plurality of marginal restricted openings in the end of the casing adjacent the pocket to admit air currents moving opposite to the material bearing current.

In testimony whereof I affix my signature.

FRANK E. DEEMS.